(12) United States Patent
Lee et al.

(10) Patent No.: US 11,405,140 B2
(45) Date of Patent: Aug. 2, 2022

(54) TERMINAL APPARATUS, BASE STATION APPARATUS, AND COMMUNICATION METHOD

(71) Applicants: Sharp Kabushiki Kaisha, Sakai (JP); FG Innovation Company Limited, Tuen Mun (HK)

(72) Inventors: Taewoo Lee, Sakai (JP); Shouichi Suzuki, Sakai (JP); Wataru Ohuchi, Sakai (JP); Tomoki Yoshimura, Sakai (JP); Liqing Liu, Sakai (JP); Huifa Lin, Sakai (JP)

(73) Assignees: SHARP KABUSHIKI KAISHA, Sakai (JP); FG INNOVATION COMPANY LIMITED, New Territories (HK)

( * ) Notice: Subject to any disclaimer, the term of this patent is extended or adjusted under 35 U.S.C. 154(b) by 163 days.

(21) Appl. No.: 17/047,091

(22) PCT Filed: Apr. 16, 2019

(86) PCT No.: PCT/JP2019/016376
§ 371 (c)(1),
(2) Date: Oct. 13, 2020

(87) PCT Pub. No.: WO2019/203246
PCT Pub. Date: Oct. 24, 2019

(65) Prior Publication Data
US 2021/0152289 A1  May 20, 2021

(30) Foreign Application Priority Data

Apr. 17, 2018 (JP) .............................. JP2018-078980

(51) Int. Cl.
*H04L 1/16* (2006.01)
*H04L 1/00* (2006.01)
(Continued)

(52) U.S. Cl.
CPC .......... *H04L 1/1671* (2013.01); *H04L 1/0013* (2013.01); *H04L 1/0061* (2013.01); *H04L 5/0055* (2013.01); *H04W 72/0413* (2013.01)

(58) Field of Classification Search
CPC ... H04L 1/1671; H04L 1/0013; H04L 1/0061; H04L 5/0055; H04W 72/0413
See application file for complete search history.

(56) References Cited

U.S. PATENT DOCUMENTS 8,892,829 B2 * 11/2014 Asokan ................. H04L 1/0071
711/E12.079
2012/0134306 A1 * 5/2012 Cheng ................... H04L 1/0042
370/281
(Continued)

FOREIGN PATENT DOCUMENTS

CA    2799148 A1 * 11/2011 ............... H04B 7/06
CN    102934384 A  *  2/2013 ........... H04L 1/0079
WO    WO-2011129611 A2 * 10/2011 .......... H03M 13/353

OTHER PUBLICATIONS

Ericsson, "CR to 38.211 capturing the Jan. 18 ad-hoc and RAN1#92 meeting agreements", R1-1803552, 3GPP TSG-RAN1 Meeting #92, Feb. 26-Mar. 1, 2018, 83 pages.
(Continued)

*Primary Examiner* — Michael J Moore, Jr.
(74) *Attorney, Agent, or Firm* — Keating & Bennett, LLP

(57) ABSTRACT

To enable efficient uplink transmission. A terminal apparatus includes: a coder configured to code a UCI payload and perform rate matching of coded bits of the UCI payload; and a transmitter configured to transmit the UCI payload by using a PUSCH, the UCI payload includes at least HARQ-ACK information and/or CSI, a length of an output sequence $E_{UCI}$ of the rate matching is provided based on a first number of CRC bits $L_{UCI}$, the first number of CRC bits $L_{UCI}$ is provided based on a size of the payload, and a size of second
(Continued)

CRC bits added to the payload is provided based on the size of the payload and the length of the output sequence $E_{UCI}$ of the rate matching.

4 Claims, 8 Drawing Sheets

(51) Int. Cl.
*H04L 5/00* (2006.01)
*H04W 72/04* (2009.01)

(56) References Cited

U.S. PATENT DOCUMENTS

| | | | |
|---|---|---|---|
| 2013/0215858 A1* | 8/2013 | Jang | H04L 5/0053 370/329 |
| 2013/0322398 A1 | 12/2013 | Jang et al. | |
| 2014/0016546 A1* | 1/2014 | Jang | H04B 7/063 370/328 |
| 2018/0206225 A1* | 7/2018 | Li | H04L 5/0053 |
| 2019/0199477 A1* | 6/2019 | Park | H04L 5/0057 |
| 2019/0312676 A1* | 10/2019 | Jeong | H03M 13/6356 |
| 2020/0136750 A1* | 4/2020 | Baldemair | H04L 5/0053 |
| 2021/0075538 A1* | 3/2021 | Noh | H04L 1/0033 |
| 2021/0152289 A1* | 5/2021 | Lee | H04L 5/0055 |

OTHER PUBLICATIONS

Huawei, "CR to 38.212 capturing the Jan. 18 ad-hoc and RAN1#92 meeting agreements", R1-1803553, 3GPP TSG RAN WG1 Meeting #92, Feb. 26-Mar. 1, 2018, 99 pages.

Samsung, "CR to 38.213 capturing the NR ad-hoc 1801 and RAN1#92 meeting agreements", R1-1803554, 3GPP TSG-RAN1 Meeting #92, Feb. 26-Mar. 1, 2018, 95 pages.

Nokia, "draftCR to 38.214 capturing the Jan. 18 ad-hoc and RAN1#92 meeting agreements", R1-1803555, 3GPP TSG-RAN1 Meeting #92, Feb. 26-Mar. 1, 2018, 77 pages.

Sharp, "Discussions on RB selection for PUCCH resource", 3GPP TSG RAN WG1#92b Meeting, R1-1804882, Apr. 16-20, 2018, pp. 1-8.

Ericsson, "On Remaining Issues on UCI Multiplexing on PUSCH", 3GPP TSG RAN WG1 Meeting #92, R1-1802908, Feb. 26-Mar. 2, 2018, 20 pages.

* cited by examiner

TERMINAL APPARATUS, BASE STATION APPARATUS, AND COMMUNICATION METHOD

TECHNICAL FIELD

The present invention relates to a terminal apparatus, a base station apparatus, and a communication method. This application claims priority based on JP 2018-78980 filed on Apr. 17, 2018, the contents of which are incorporated herein by reference.

BACKGROUND ART

A radio access method and a radio network for cellular mobile communications (hereinafter, referred to as "Long Term Evolution (LTE: registered trademark)" or "Evolved Universal Terrestrial Radio Access (EUTRA)") have been studied in the 3rd Generation Partnership Project (3GPP). Further, in the 3GPP, a new radio access method (hereinafter referred to as "New Radio (NR)") is being studied (NPLs 1, 2, 3, 4). In LTE, a base station apparatus is also referred to as an evolved NodeB (eNodeB). In NR, a base station apparatus is also referred to as a gNodeB. In LTE, and in NR, a terminal apparatus is also referred to as user equipment (UE). LTE, as well as NR, is a cellular communication system in which multiple areas are deployed in a cellular structure, with each of the multiple areas being covered by a base station apparatus. A single base station apparatus may manage multiple cells.

In NR, a set of downlink BWP (bandwidth part) and uplink BWP is configured for one serving cell (NPL 3). The terminal apparatus receives a PDCCH and a PDSCH in the downlink BWP.

CITATION LIST

Non Patent Literature

NPL 1: "3GPP TS 38.211 V15.0.0 (2018-03), NR; Physical channels and modulation," R1-1803552, 14 Mar. 2018.
NPL 2: "3GPP TS 38.212 V15.0.0 (2018-03), NR; Multiplexing and channel coding," R1-1803553, 14 Mar. 2018.
NPL 3: "3GPP TS 38.213 V15.0.0 (2018-03), NR; Physical layer procedures for control," R1-1803554, 14 Mar. 2018
NPL 4: "3GPP TS 38.214 V15.0.0 (2018-03), NR; Physical layer procedures for data," R1-1803555, 8th March, 2018

SUMMARY OF INVENTION

Technical Problem

One aspect of the present invention provides a terminal apparatus capable of efficiently performing uplink transmission, a communication method used by the terminal apparatus, a base station apparatus capable of efficiently receiving uplink transmission, and a communication method used by the base station apparatus.

Solution to Problem (1) According to a first aspect of the present invention, there is provided a terminal apparatus including: a coder configured to code a UCI payload and perform rate matching of coded bits of the UCI payload; and a transmitter configured to transmit the UCI by using a PUSCH, in which the UCI payload includes at least HARQ-ACK information and/or CSI, a length of an output sequence $E_{UCI}$ of the rate matching is provided based on a first number of CRC bits $L_{UCI}$, the first number of CRC bits $L_{UCI}$ is provided based on a size of the payload, and a size of second CRC bits added to the payload is provided based on the size of the payload and the length of the output sequence $E_{UCI}$ of the rate matching.

(2) According to a second aspect of the present invention, there is provided a base station apparatus including: a decoder configured to decode a UCI payload and perform rate matching of decoded bits of the UCI payload; and a receiver configured to receive the UCI payload by using a PUSCH, in which the UCI payload includes at least HARQ-ACK information and/or CSI, a length of an output sequence $E_{UCI}$ of the rate matching is provided based on a first number of CRC bits $L_{UCI}$, the first number of CRC bits $L_{UCI}$ is provided based on a size of the payload, and a size of second CRC bits added to the payload is provided based on the size of the payload and the length of the output sequence $E_{UCI}$ of the rate matching.

(3) According to a third aspect of the present invention, there is provided a communication method used by a terminal apparatus including: coding a UCI payload; performing rate matching of coded bits of the UCI payload; and transmitting the UCI payload by using a PUSCH, in which the UCI payload includes at least HARQ-ACK information and/or CSI, a length of an output sequence $E_{UCI}$ of the rate matching is provided based on a first number of CRC bits $L_{UCI}$, the first number of CRC bits $L_{UCI}$ is provided based on a size of the payload, and a size of second CRC bits added to the payload is provided based on the size of the payload and the length of the output sequence $E_{UCI}$ of the rate matching.

(4) According to a fourth aspect of the present invention, there is provided a communication method used by a base station apparatus including: decoding a UCI payload; performing rate matching of decoded bits of the UCI payload; and receiving the UCI payload by using a PUSCH, in which the UCI payload includes at least HARQ-ACK information and/or CSI, a length of an output sequence $E_{UCI}$ of the rate matching is provided based on a first number of CRC bits $L_{UCI}$, the first number of CRC bits $L_{UCI}$ is provided based on a size of the payload, and a size of second CRC bits added to the payload is provided based on the size of the payload and the length of the output sequence $E_{UCI}$ of the rate matching.

Advantageous Effects of Invention

According to the present invention, the terminal apparatus can efficiently perform uplink transmission. Also, the base station apparatus can efficiently receive uplink transmission.

DESCRIPTION OF EMBODIMENTS

Embodiments of the present invention will be described below.

Figure 1:
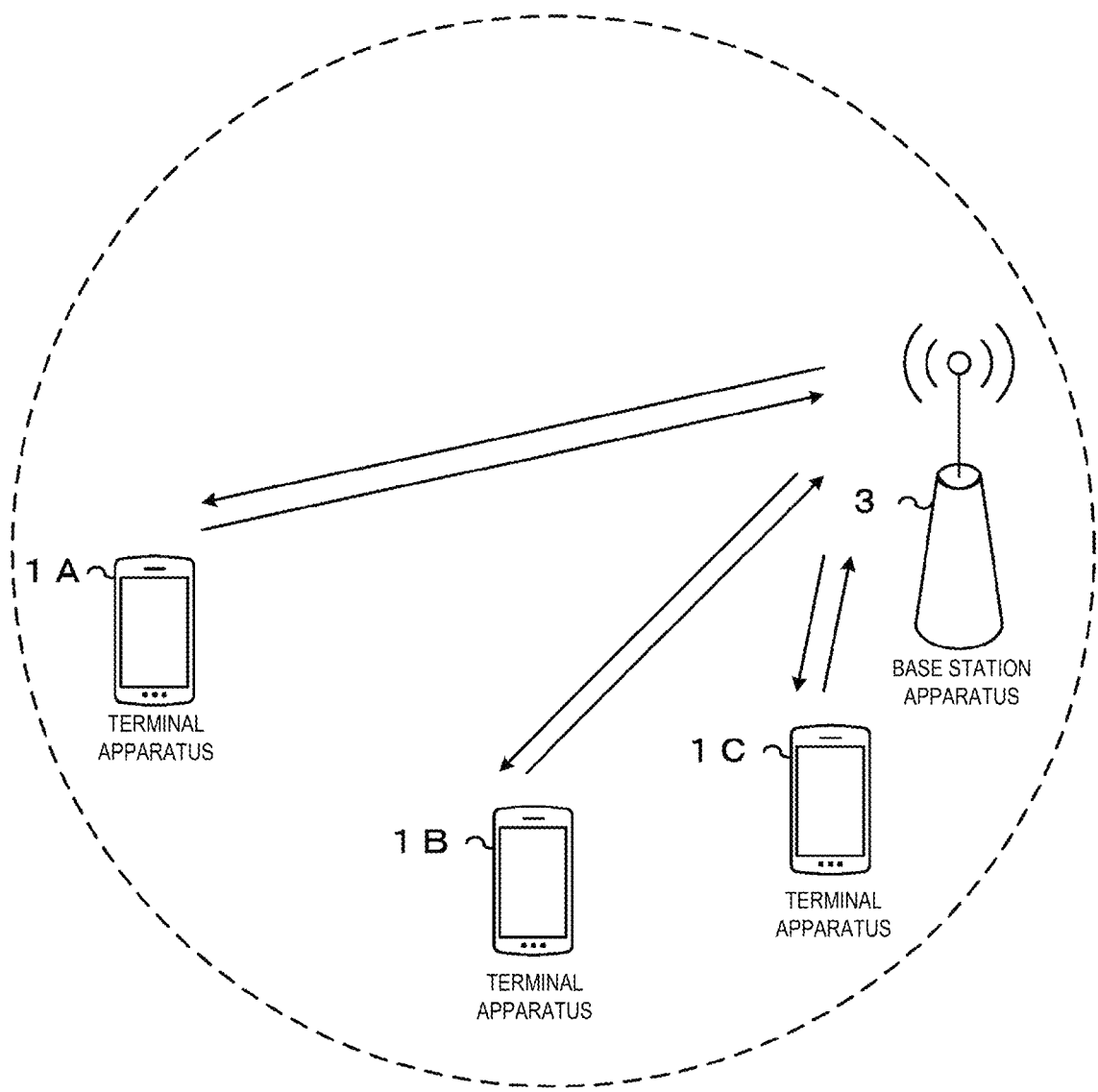
FIG. 1 is a conceptual diagram of a radio communication system according to the present embodiment.

FIG. 1 is a conceptual diagram of a radio communication system according to the present embodiment. In FIG. 1, the radio communication system includes terminal apparatuses 1A to 1C and a base station apparatus 3. The terminal apparatuses 1A to 1C are each referred to as a terminal apparatus 1.

Physical channels and physical signals according to the present embodiment will be described.

In uplink radio communication from the terminal apparatus 1 to the base station apparatus 3, the following uplink physical channels are used. The uplink physical channels are used for transmitting information output from a higher layer.

Physical Uplink Control Channel (PUCCH)
Physical Uplink Shared Channel (PUSCH)
Physical Random Access Channel (PRACH)

The PUCCH is used for the terminal apparatus 1 to transmit uplink control information (UCI) to the base station apparatus 3. Note that in the present embodiment, the terminal apparatus 1 may transmit the PUCCH in a primary cell and/or a secondary cell having a function of the primary cell, and/or a secondary cell capable of transmitting the PUCCH. In other words, the PUCCH may be transmitted in a specific serving cell.

The uplink control information includes at least one of: downlink channel state information (CSI); a scheduling request (SR) indicating a request for a PUSCH resource; or a hybrid automatic repeat request acknowledgement (HARQ-ACK) for downlink data (a transport block, a medium access control protocol data unit (MAC PDU), a downlink-shared channel (DL-SCH), or a physical downlink shared channel (PDSCH)).

The HARQ-ACK is also referred to as an ACK/NACK, HARQ feedback, HARQ-ACK feedback, a HARQ response, a HARQ-ACK response, HARQ information, HARQ-ACK information, HARQ control information, and HARQ-ACK control information. In a case that downlink data is successfully decoded, an ACK for the downlink data is generated. In a case that the downlink data is not successfully decoded, a NACK for the downlink data is generated. Discontinuous transmission (DTX) may mean that the downlink data has not been detected. The discontinuous transmission (DTX) may mean that data for which a HARQ-ACK response is to be transmitted has not been detected. The HARQ-ACK may include at least a HARQ-ACK bit corresponding at least to one transport block. The HARQ-ACK bit may indicate an acknowledgement (ACK) corresponding to one or multiple transport blocks or a negative-acknowledgement (NACK). The HARQ-ACK may include at least a HARQ-ACK codebook including one or multiple HARQ-ACK bits. The fact that the HARQ-ACK bit corresponds to the one or multiple transport blocks may mean that the HARQ-ACK bit corresponds to a PDSCH including the one or multiple transport blocks.

The HARQ-ACK bit may indicate an ACK or NACK corresponding to one code block group (CBG) included in the transport blocks. The HARQ-ACK is also referred to as HARQ feedback, HARQ information, or HARQ control information.

The channel state information (CSI) may include a channel quality indicator (CQI) and a rank indicator (RI). The channel quality indicator may include a precoder matrix indicator (PMI) or a CSI-RS indicator (CRI). The channel state information may include a precoder matrix indicator. The CQI is an indicator associated with channel quality (propagation strength), and the PMI is an indicator indicating a precoder. The RI is an indicator indicating a transmission rank (or the number of transmission layers). The CSI is also referred to as a CSI report or CSI information.

The CSI report may be divided into one or multiple pieces. In a case that the CSI report is divided into two pieces, for example, the first split CSI report may be CSI-part1 while the second split CSI report may be CSI-part2. The size of the CSI report may be the number of bits corresponding to a part or an entirety of the divided CSI. The size of the CSI report may be the number of bits of CSI-part1. The size of the CSI report may be the number of bits of CSI-part2. The size of the CSI report may be a sum of the numbers of bits of the plurality of separate pieces of CSI report. The sum of the numbers of bits of the plurality of separate pieces of CSI equals to the number of bits of the CSI report before the division. The CSI-part1 may include at least some or all of RI, CRI, CQI, and PMI. The CSI-part2 may include some or all of PMI, CQI, RI, and CRI.

The scheduling request (SR) may be used at least to request a PUSCH resource for initial transmission. The scheduling request bit may be used to indicate either a positive SR or a negative SR. The fact that the scheduling request bit indicates a positive SR is also referred to as "a positive SR being transmitted". The positive SR may indicate that the terminal apparatus 1 requests a PUSCH resource for initial transmission. The positive SR may indicate that the scheduling request is triggered by a higher layer. The positive SR may be transmitted in a case that the higher layer indicates transmission of the scheduling request. The fact that the scheduling request bit indicates a negative SR is also referred to as "a negative SR being transmitted". The negative SR may indicate that the terminal apparatus 1 does not request a PUSCH resource for initial transmission. The negative SR may indicate that the scheduling request is not triggered by a higher layer. The negative SR may be transmitted in a case that the higher layer does not indicate transmission of the scheduling request.

The scheduling request bit may be used to indicate either a positive SR or a negative SR for any of one or multiple SR configurations. The one SR configuration or each of the plurality of SR configurations may correspond to one or multiple logical channels. A positive SR for a certain SR configuration may be a positive SR for one or all of one or multiple logical channels corresponding to the certain SR configuration. The negative SR may not correspond to a specific SR configuration. The fact that a negative SR is indicated may be the fact that a negative SR is indicated for all SR configurations.

The SR configuration may be a scheduling request ID.

The PUSCH may be used to transmit uplink data (a transport block, a medium access control protocol data unit (MAC PDU), or an uplink-shared channel (UL-SCH)). The PUSCH may be used to transmit a HARQ-ACK and/or channel state information along with the uplink data. Furthermore, the PUSCH may be used to transmit only the channel state information or to transmit only the HARQ-ACK and the channel state information. In other words, the PUSCH may be used to transmit uplink control information. The terminal apparatus 1 may transmit the PUSCH based on the detection of a physical downlink control channel (PDCCH) including an uplink grant.

The PRACH may be used to transmit a random access preamble (random access message 1). The PRACH may be used to indicate at least some of an initial connection establishment procedure, a handover procedure, a connection re-establishment procedure, synchronization (timing adjustment) for transmission of uplink data, and a request for a PUSCH (UL-SCH) resource.

In uplink radio communication from the terminal apparatus 1 to the base station apparatus 3, the following uplink physical signals may be used. The uplink physical signals may not be used to transmit information output from a higher layer, but may be used by a physical layer.

Uplink Reference Signal (UL RS)

According to the present embodiment, at least the following two types of uplink reference signal may be at least used.

Demodulation Reference Signal (DMRS)

Sounding Reference Signal (SRS)

The DMRS is associated with transmission of a PUSCH and/or a PUCCH. The DMRS may be multiplexed with the PUSCH or the PUCCH. The base station apparatus 3 uses the DMRS in order to perform channel compensation of the PUSCH or the PUCCH. Transmission of both of the PUSCH and the DMRS is hereinafter referred to simply as transmission of the PUSCH. The DMRS may correspond to the PUSCH. Transmission of both of the PUCCH and the DMRS is hereinafter referred to simply as transmission of the PUCCH. The DMRS may correspond to the PUCCH.

The SRS may not be associated with transmission of the PUSCH and/or the PUCCH. An SRS may be associated with transmission of the PUSCH and/or the PUCCH. The base station apparatus 3 may use the SRS for measuring a channel state. The SRS may be transmitted in one or multiple, namely, a predetermined number of OFDM symbols from the end of the uplink slot.

The following downlink physical channels may be used for downlink radio communication from the base station apparatus 3 to the terminal apparatuses 1. The downlink physical channels may be used for the physical layer to transmit information output from the higher layer.

Physical Broadcast Channel (PBCH)

Physical Downlink Control Channel (PDCCH)

Physical Downlink Shared Channel (PDSCH)

The PBCH is used to broadcast a master information block (MIB) commonly used by one or multiple terminal apparatuses 1 in a serving cell, an active bandwidth part (BWP), or a carrier. The PBCH may be transmitted at a prescribed transmission interval. For example, the PBCH may be transmitted at an interval of 80 ms. At least some of information included in the PBCH may be updated every 80 ms. The PBCH may include a predetermined number of subcarriers (288 subcarriers, for example) in a frequency domain. Also, the PBCH may be configured to include two, three, or four OFDM symbols in a time domain. The MIB may include information on an identifier (index) of a synchronization signal. The MIB may include information indicating at least some of numbers of a slot, a subframe, and a radio frame in which a PBCH is transmitted. First configuration information may be included in the MIB. The first configuration information may be configuration information used at least in some or all of a random access message 2, a random access message 3, and a random access message 4.

The PDCCH is used to transmit downlink control information (DCI). The downlink control information is also referred to as DCI format. Note that the DCI format may be configured to include a field of one or multiple pieces of downlink control information. The downlink control information may include at least either an uplink grant or a downlink grant.

The uplink grant is used for scheduling of a single PUSCH in a single cell. The uplink grant may be used for scheduling multiple PUSCHs in multiple slots in a single cell. The uplink grant may be used for scheduling a single PUSCH in multiple slots in a single cell. The downlink control information including the uplink grant may also be referred to as an uplink-related DCI format.

A single downlink grant is at least used for scheduling of a single PDSCH in a single serving cell. The downlink grant is at least used for the scheduling of the PDSCH in the same slot as the slot in which the downlink grant is transmitted. The downlink control information including the downlink grant may also be referred to as a downlink-related DCI format.

The PDSCH is used to transmit downlink data (TB, MAC PDU, DL-SCH, PDSCH, CB, and CBG). The PDSCH is at least used to transmit a random access message 2 (random access response). The PDSCH is used at least to transmit system information including parameters used for an initial access.

The BCH, UL-SCH, and DL-SCH described above are transport channels. A channel used in a Medium Access Control (MAC) layer is referred to as a transport channel. A unit of the transport channel used in the MAC layer is also referred to as a transport block or a MAC PDU. A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and a modulation process is performed for each codeword.

The base station apparatus 3 and the terminal apparatus 1 may exchange (transmit and/or receive) signals in the higher layer. For example, the base station apparatus 3 and the terminal apparatus 1 may transmit and/or receive Radio Resource Control (RRC) signaling (also referred to as a Radio Resource Control (RRC) message or Radio Resource Control (RRC) information) in an RRC layer. Furthermore, the base station apparatus 3 and the terminal apparatus 1 may transmit and/or receive, in the MAC layer, a MAC Control Element (CE). Here, the RRC signaling and/or the MAC CE is also referred to as higher layer signaling.

The PUSCH and the PDSCH are at least used to transmit the RRC signaling and the MAC CE. Here, the RRC signaling transmitted from the base station apparatus 3 in the PDSCH may be RRC signaling common to multiple terminal apparatuses 1 in a cell. The RRC signaling common to the plurality of terminal apparatuses 1 in the cell is also referred to as common RRC signaling. The RRC signaling transmitted from the base station apparatus 3 on the PDSCH may be RRC signaling dedicated to a certain terminal apparatus 1 (which is also referred to as dedicated signaling or UE specific signaling). The RRC signaling dedicated to the terminal apparatus 1 is also referred to as dedicated RRC signaling. A cell specific parameter may be transmitted using the RRC signaling common to the multiple terminal apparatuses 1 in the cell or the RRC signaling dedicated to the certain terminal apparatus 1. A UE specific parameter may be transmitted using the RRC signaling dedicated to the certain terminal apparatus 1.

A configuration of the radio frame according to the present embodiment will be described below.

Figure 2:
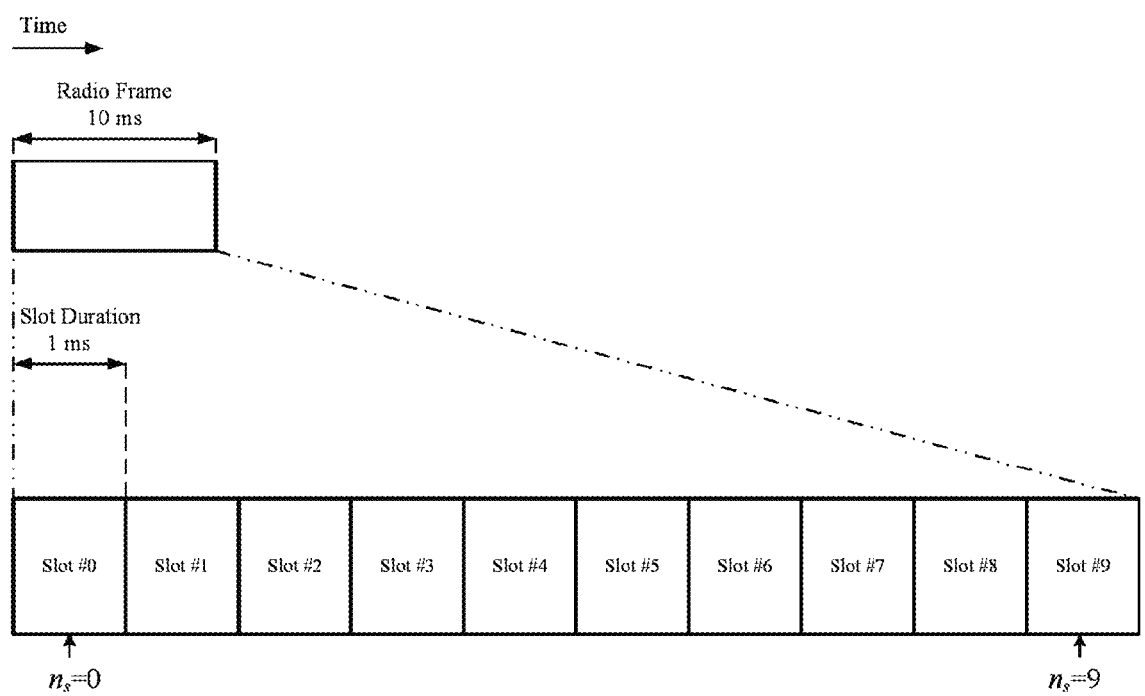
FIG. 2 is a diagram illustrating a schematic configuration of a radio frame according to the present embodiment.

FIG. 2 is a diagram illustrating a schematic configuration of a radio frame according to the present embodiment. In FIG. 2, the horizontal axis is a time axis. Each of the radio frames may be 10 ms in length. Furthermore, each of the radio frames may include ten slots. Each of the slots may be 1 ms in length.

Figure 3:
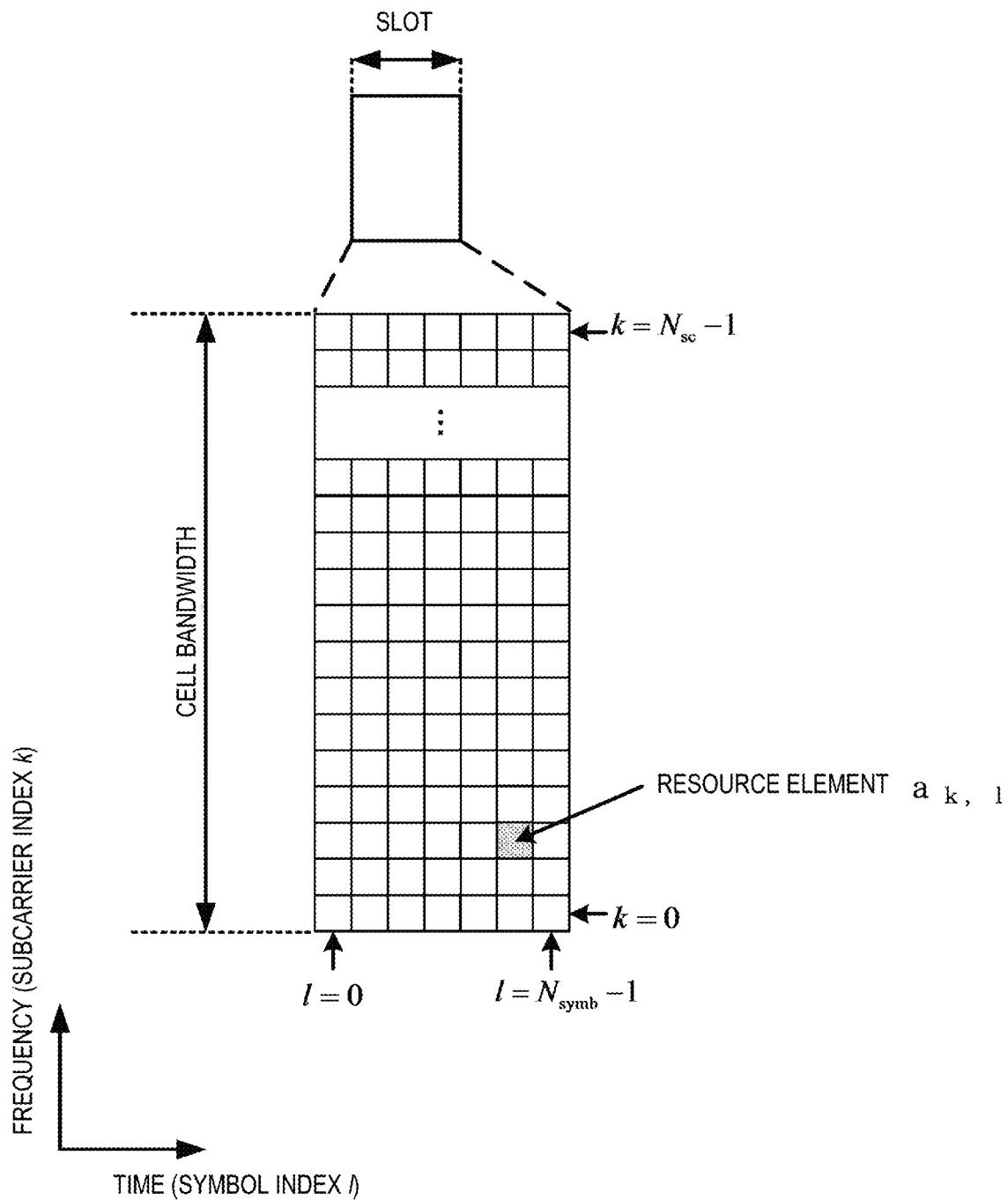
FIG. 3 is a diagram illustrating a schematic configuration of an uplink slot according to the present embodiment.

An example configuration of a slot according to the present embodiment will be described below. FIG. 3 is a diagram illustrating a schematic configuration of an uplink slot according to the present embodiment. FIG. 3 illustrates a configuration of an uplink slot in a cell. In FIG. 3, the horizontal axis is a time axis, and the vertical axis is a frequency axis. The uplink slot may include $N^{UL}_{symb}$ SC-FDMA symbols. The uplink slot may include $N^{UL}_{symb}$ OFDM symbols. Although the present embodiment will be described below using a case that the uplink slot includes OFDM symbols, the present embodiment can also be applied to a case in which the uplink slot includes SC-FDMA symbols.

In FIG. 3, l is an OFDM symbol number/index, and k is a subcarrier number/index. The physical signal or the physical channel transmitted in each of the slots is represented by a resource grid. In the uplink, the resource grid is defined by multiple subcarriers and multiple OFDM symbols. Each element in the resource grid is referred to as a resource element. The resource element is represented by a subcarrier number/index k and an OFDM symbol number/index l.

The uplink slot may include multiple OFDM symbols l (l=0, 1, . . . , $N^{UL}_{symb}-1$) in the time domain. In one uplink slot, $N^{UL}_{symb}$ may be 7 or 14 for a normal cyclic prefix (CP) in the uplink. For an extended cyclic prefix (CP) in the uplink, $N^{UL}_{symb}$ may be 6 or 12.

The terminal apparatus 1 receives the parameter UL-CyclicPrefixLength of the higher layer indicating the CP length in the uplink from the base station apparatus 3. The base station apparatus 3 may broadcast, in a cell, system information including the parameter UL-CyclicPrefix-Length of the higher layer corresponding to the cell.

The uplink slot may include multiple subcarriers k (k=0, 1, . . . , $N^{UL}_{RB} \cdot N^{RB}_{SC}-1$) in the frequency domain. $N^{UL}_{RB}$ is an uplink bandwidth configuration for a serving cell and is expressed by a multiple of $N^{RB}_{SC}$. $N^{RB}_{SC}$ is a (physical) resource block size in the frequency domain expressed by the number of subcarriers. The subcarrier spacing Δf may be 15 kHz. The $N^{RB}_{SC}$ may be 12. The (physical) resource block size in the frequency domain may be 180 kHz.

One physical resource block is defined by $N^{UL}_{symb}$ consecutive OFDM symbols in the time domain and $N^{RB}_{SC}$ consecutive subcarriers in the frequency domain. Hence, one physical resource block includes ($N^{UL}_{symb} \cdot N^{RB}_{SC}$) resource elements. One physical resource block may correspond to one slot in the time domain. The physical resource blocks may be numbered $n_{PRB}$ (0, 1, . . . , $N^{UL}_{RB}-1$) in an ascending order from the lower frequencies in the frequency domain.

The downlink slot according to the present embodiment includes multiple OFDM symbols. Since the downlink slot configuration according to the present embodiment is basically the same as the uplink slot configuration, the description of the configuration of the downlink slot will be omitted.

Configurations of apparatuses according to the present embodiment will be described below.

Figure 4:
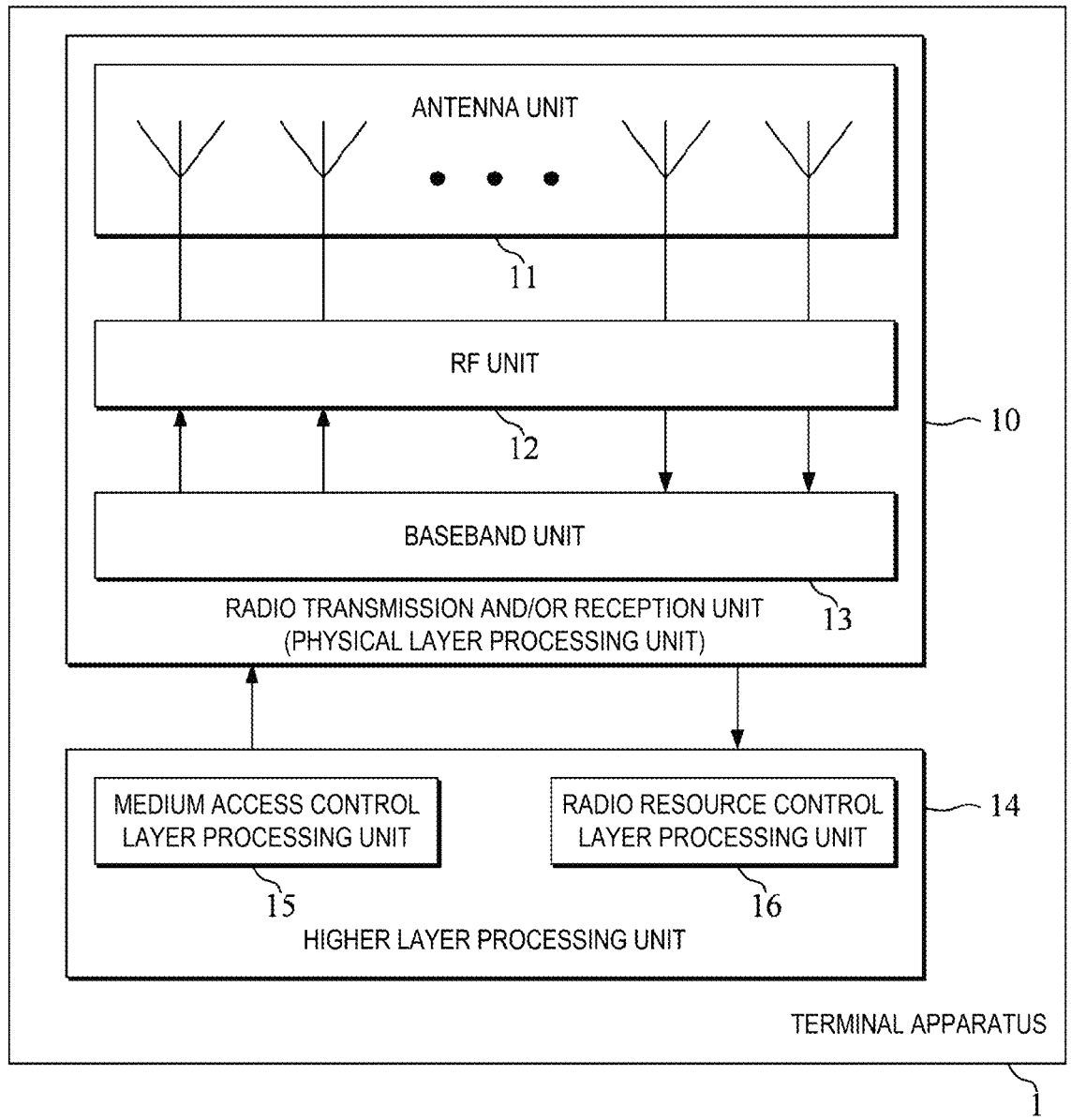
FIG. 4 is a schematic block diagram illustrating a configuration of a terminal apparatus 1 according to the present embodiment.

FIG. 4 is a schematic block diagram illustrating a configuration of the terminal apparatus 1 according to the present embodiment. As illustrated, the terminal apparatus 1 is configured to include a radio transmission and/or reception unit 10 and a higher layer processing unit 14. The radio transmission and/or reception unit 10 is configured to include an antenna unit 11, a Radio Frequency (RF) unit 12, and a baseband unit 13. The higher layer processing unit 14 is configured to include a medium access control layer processing unit 15 and a radio resource control layer processing unit 16. The radio transmission and/or reception unit 10 is also referred to as a transmitter, a receiver, a coder, a decoder, or a physical layer processing unit.

The higher layer processing unit 14 outputs uplink data (transport block) generated by a user operation or the like, to the radio transmission and/or reception unit 10. The higher layer processing unit 14 performs processing of the medium access control (MAC) layer, the packet data convergence protocol (PDCP) layer, the radio link control (RLC) layer, and the radio resource control (RRC) layer.

The medium access control layer processing unit 15 included in the higher layer processing unit 14 performs processing of the Medium Access Control layer. The medium access control layer processing unit 15 controls random access procedure in accordance with various types of configuration information/parameters managed by the radio resource control layer processing unit 16.

The radio resource control layer processing unit 16 included in the higher layer processing unit 14 performs processing of the Radio Resource Control layer. The radio resource control layer processing unit 16 manages various types of configuration information/parameters of the terminal apparatus 1. The radio resource control layer processing unit 16 sets various types of configuration information/parameters based on a higher layer signaling received from the base station apparatus 3. Namely, the radio resource control layer processing unit 16 sets the various configuration information/parameters in accordance with the information for indicating the various configuration information/parameters received from the base station apparatus 3.

The radio transmission and/or reception unit 10 performs processing of the physical layer, such as modulation, demodulation, coding, decoding, and the like. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 generates a transmit signal by modulating and coding data, and performs transmission to the base station apparatus 3.

The RF unit 12 converts (down-converts) a signal received via the antenna unit 11 into a baseband signal by orthogonal demodulation, and removes unnecessary frequency components. The RF unit 12 outputs a processed analog signal to the baseband unit.

The baseband unit 13 converts the analog signal input from the RF unit 12 from the analog signal to a digital signal. The baseband unit 13 removes a portion corresponding to a Cyclic Prefix (CP) from the digital signal resulting from the conversion, performs Fast Fourier Transform (FFT) of the signal from which the CP has been removed, and extracts a signal in the frequency domain.

The baseband unit 13 generates an SC-FDMA symbol by performing Inverse Fast Fourier Transform (IFFT) of the data, adds CP to the generated SC-FDMA symbol, generates a baseband digital signal, and converts the baseband digital signal into an analog signal. The baseband unit 13 outputs the converted analog signal to the RF unit 12.

The RF unit 12 removes unnecessary frequency components from the analog signal input from the baseband unit 13 by using a low-pass filter, up-converts the analog signal into a signal of a carrier frequency, and transmits the up-converted signal via the antenna unit 11. Furthermore, the RF unit 12 amplifies power. Furthermore, the RF unit 12 may have a function of controlling a transmission power. The RF unit 12 is also referred to as a transmission power control unit.

Figure 5:
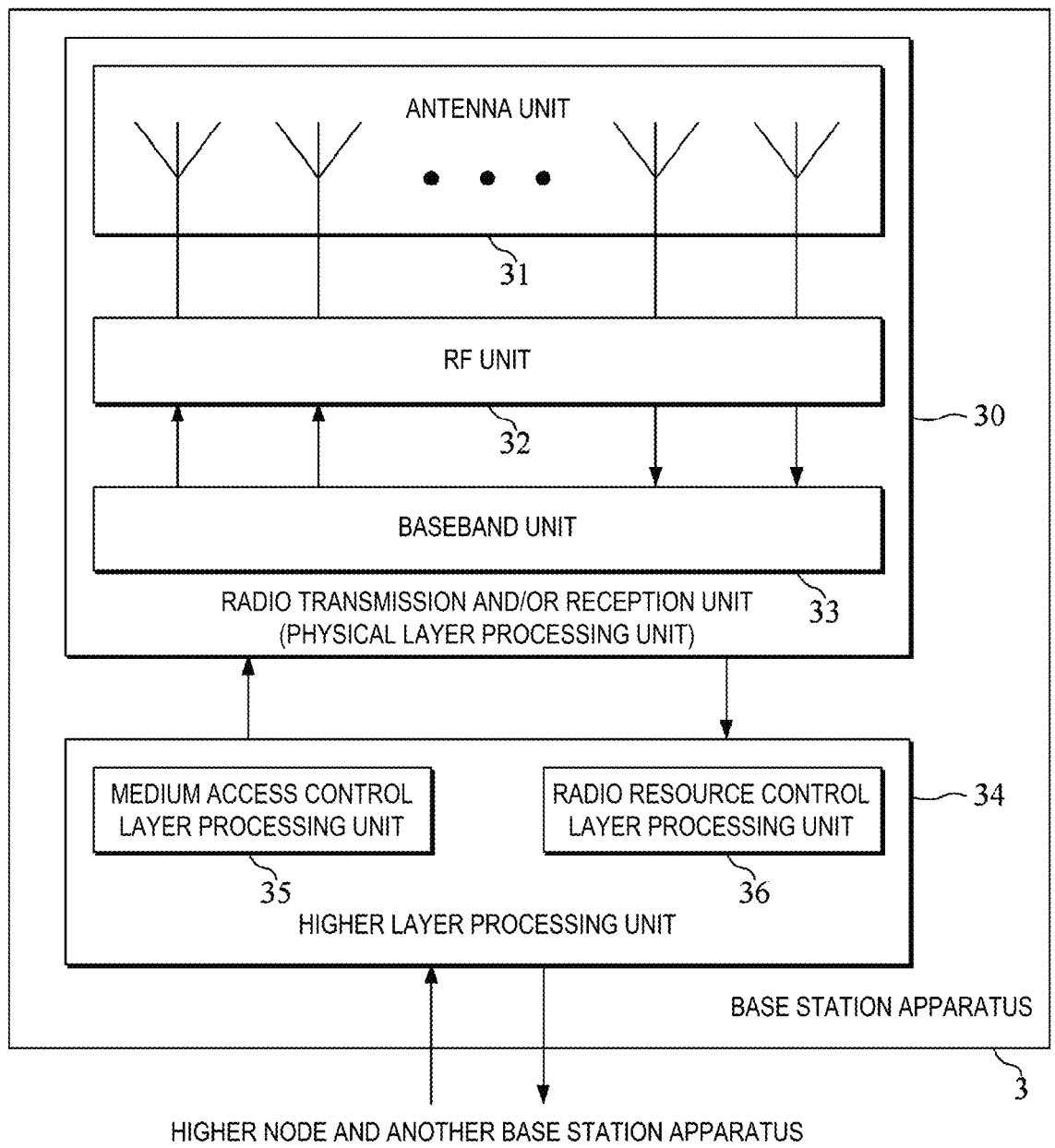
FIG. 5 is a schematic block diagram illustrating a configuration of a base station apparatus 3 according to the present embodiment.

FIG. 5 is a schematic block diagram illustrating a configuration of the base station apparatus 3 according to the present embodiment. As illustrated, the base station apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmitter, a receiver, a coder, a decoder, or a physical layer processing unit.

The higher layer processing unit 34 performs processing of the medium access control (MAC) layer, the packet data convergence protocol (PDCP) layer, the radio link control (RLC) layer, and the radio resource control (RRC) layer.

The medium access control layer processing unit 35 included in the higher layer processing unit 34 performs processing of the Medium Access Control layer. The medium access control layer processing unit 35 controls random access procedure in accordance with various types of configuration information/parameters managed by the radio resource control layer processing unit 36.

The radio resource control layer processing unit 36 included in the higher layer processing unit 34 performs processing of the Radio Resource Control layer. The radio resource control layer processing unit 36 generates, or acquires from a higher node, downlink data (transport block) allocated on a physical downlink shared channel, system information, an RRC message, a MAC Control Element (CE), and the like, and performs output to the radio transmission and/or reception unit 30. Furthermore, the radio resource control layer processing unit 36 manages various types of configuration information/parameters for each of the terminal apparatuses 1. The radio resource control layer processing unit 36 may set various types of configuration information/parameters for each of the terminal apparatuses 1 via higher layer signaling. That is, the radio resource control layer processing unit 36 transmits/reports information indicating various types of configuration information/parameters.

The functionality of the radio transmission and/or reception unit 30 is similar to the functionality of the radio transmission and/or reception unit 10, and hence description thereof is omitted.

Each of the units having the reference signs 10 to 16 included in the terminal apparatus 1 may be configured as a circuit. Each of the units having the reference signs 30 to 36 included in the base station apparatus 3 may be configured as a circuit. Each of the units that are included in the terminal apparatus 1 and have the reference signs 10 to 16 may be configured as at least one processor and a memory coupled to the at least one processor. Each of the units that are included in the base station apparatus 3 and have the reference signs 30 to 36 may be configured as at least one processor and a memory coupled to the at least one processor.

Time Division Duplex (TDD) and/or Frequency Division Duplex (FDD) may be applied to a radio communication system according to the present embodiment. In a case of a cell aggregation, serving cells to which TDD is applied and serving cells to which FDD is applied may be aggregated.

Note that the higher layer signaling may be any one of remaining minimum system information (RMSI), other system information (OSI), a system information block (SIB), a radio resource control (RRC) message, and a medium access control control element (MAC CE). Also, the higher layer parameter may mean a parameter or an information element included in the higher layer signaling.

The UCI transmitted in the PUSCH may include a HARQ-ACK and/or CSI.

The terminal apparatus 1 successfully decodes an uplink DCI format in a certain serving cell and then performs an aperiodic CSI report using the PUSCH in the serving cell. The aperiodic CSI report transmitted using the PUSCH supports a wideband and/or sub-band frequency granularity. Also, the aperiodic CSI report transmitted in the PUSCH supports CSI of a type I and/or a type II.

The terminal apparatus 1 successfully decodes a DCI format 0_1 that activates a semi-persistent CSI trigger state and then performs a semi-persistent CSI report. The DCI format 0_1 includes a CSI request field for indicating whether to activate the semi-persistent CSI trigger state. The semi-persistent CSI report transmitted in the PUSCH supports a wideband and/or sub-band frequency granularity. A PUSCH resource and/or a modulation and coding scheme (MCS) is semi-persistently allocated in the uplink DCI format.

The CSI report transmitted in the PUSCH may be multiplexed with uplink data transmitted in the PUSCH. Also, the CSI report transmitted in the PUSCH may be transmitted even without uplink data.

A CSI report feedback of the type I is supported by the CSI report transmitted in the PUSCH. Also, the type-I sub-band CSI is supported by the CSI report transmitted in the PUSCH. Moreover, the type II CSI is supported by the CSI report transmitted in the PUSCH.

In the type I and/or type II CSI feedback transmitted in the PUSCH, the CSI report may include two parts. The two parts may be referred to as part1 and/or part2. The two parts may be referred to as CSI-part1 and/or CSI-part2.

The CSI-part1 may be used to identify the number of information bits of the CSI-part2. The CSI-part1 may be used to transmit the entire CSI-part1 and identify the numbers of information bits of the CSI-part2 before the CSI-part2 is transmitted.

In the CSI feedback of the type I, the CSI-part1 may include a rank indicator (RI) and/or a CSI-RS indicator (CRI) and/or CQI of a first codeword. For the type I and/or type II feedback, the part1 may have a fixed payload size. Also, the part1 may include a numerical indicator of a wideband amplitude coefficient for each layer that is not zero (0) in the RI, the CQI, and/or the type II CSI. The part1 may be coded separately from the Part2. The part2 may include PMI of type II CSI.

The type II CSI report transmitted in the PUSCH may be independently calculated regardless of the type II CSI report transmitted in a PUCCH format 1, a PUCCH format 2, a PUCCH format 3, and/or a PUCCH format 4.

In a case that the higher layer parameter ReportQuantity includes any of the values of CSI/RSRP and/or SSBRI/

RSRP, the CSI feedback may be configured in one part. In other words, in a case that the higher layer parameter ReportQuantity includes any of the values of CSI/RSRP and/or SSBRI/RSRP, the CSI feedback may be configured in the CSI-part1. Also, in a case that the higher layer parameter ReportQuantity includes any of the values of CSI/RSRP and/or SSBRI/RSRP, the CSI feedback may be configured in the CSI-part2.

In the type I and/or type II report configured for the PUCCH and transmitted in the PUSCH, an encoding scheme may follow an encoding scheme of the PUCCH. In other words, in the type I and/or type II report configured for the PUCCH and transmitted in the PUSCH, the encoding scheme may be a polar code.

In a case that the CSI report transmitted in the PUSCH is divided into two pieces, the terminal apparatus 1 may remove a part or an entirety of the CSI-part2. The "removal (omission)" may mean that a part or an entirety of data is discarded without being transmitted in accordance with a rule. The removal may also be referred to as dropping. The rule may be a priority order (priority level).

Equation 1 represents a method for determining the number $Q'_{UCI}$ of coded modulation symbols for each layer of UCI transmitted simultaneously with UL-SCH in the PUSCH. Here, the coded modulation symbols are used to derive the length $E_{UCI}$ of an output sequence of rate matching. Here, the coded modulation symbols may be a set (a group or an aggregation) of coded bits. The coded modulation symbols include the same number of coded bits as the modulation order for the PUSCH. The coded modulation symbols correspond to modulation symbols. One modulation symbol (complex value symbol) is obtained by modulating one coded modulation symbol. The number of coded modulation symbols is the same number as the number of modulation symbols (complex value symbols). The modulation scheme may be QPSK or BPSK. In Equation 1, $M_{all}$ may be provided at least based on Equation 2 or may be provided at least based on Equation 2A. In Equation 1, $O_{UCI}$ may be the number of bits of a UCI payload a. $L_{UCI}$ may be the number of CRC bits added to the UCI payload a. $K_{all}$ may be provided at least based on Equation 3. In Equation 1, α may include a higher layer parameter uci-on-pusch-scaling or may be provided at least based on any of the values 0.5, 0.65, 0.8, and 1. In Equation 1, $M_0$ may be provided at least based on Equation 4. In Equation 1, $Q'_{other}$ may be a sum of some or all of the coded modulation symbols $Q'_{UCI}$ of the UCI transmitted in the PUSCH. In Equation 1, $Q'_{other}$ may be 0, $Q'_{ACK}$, or a sum of $Q'_{ACK}$ and $Q'_{CSI-1}$. Also, ceil(F) is a function of rounding up a numerical value F to output the least integer greater than F. min{F1, F2} is a function of outputting a smaller value out of F1 and F2.

The HARQ-ACK transmitted simultaneously with the UL-SCH in the PUSCH will be referred to as $U_{ACK}$. The CSI-part1 transmitted simultaneously with the UL-SCH in the PUSCH will be referred to as $U_{CSI-1}$. The CSI-part2 transmitted simultaneously with the UL-SCH in the PUSCH will be referred to as $U_{CSI-2}$. Also, the number of coded modulation symbols for each layer of $U_{ACK}$ will be referred to as $Q'_{ACK}$, the number of coded modulation symbols for each layer of $U_{CSI-1}$ will be referred to as $Q'_{CSI-1}$, and the number of coded modulation symbols for each layer of $U_{CSI-2}$ will be referred to as $Q'_{CSI-2}$. The number of bits of $U_{ACK}$ will be referred to as $O_{ACK}$, the number of bits of $U_{CSI-1}$ will be referred to as $O_{CSI-1}$, and the number of bits of $U_{CSI-2}$ will be referred to as $O_{CSI-2}$.

In Equation 2, $M_{SC}^{UCI}(l)$ may be the number of resource elements used in UCI transmission in the l-th OFDM symbol. Here, l may be an integer from 0 to $N_{symb,all}^{PUSCH}-1$. In other words, a relationship of l=0, 1, 2, . . . , $N_{symb,all}^{PUSCH}-1$ may be satisfied. Also, $N_{symb,all}^{PUSCH}$ may be a total number of OFDM symbols used in the PUSCH transmission. The number of OFDM symbols used in DMRS may be included in $N_{symb,all}^{PUSCH}$. In a case of an OFDM symbol that transmits a DMRS of the PUSCH, $M_{SC}^{UCI}(l)$ may be 0. In a case of an OFDM symbol that does not transmit a DMRS of the PUSCH, $M_{SC}^{UCI}(l)$ may be provided at least based on a value obtained by subtracting the number of subcarriers of the PT-RS in the l-th OFDM symbol including the PT-RS from the scheduled bandwidth for the PUSCH transmission expressed by the number of subcarriers. In other words, a relationship of $M_{SC}^{UCI}(l)=M_{SC}^{PUSCH}-M_{SC}^{PT-RS}(l)$ may be satisfied. Here, $M_{SC}^{PUSCH}$ may be a scheduled bandwidth for the PUSCH transmission expressed by the number of subcarriers. Also, $M_{SC}^{PT-RS})$ may be the number of subcarriers that transmit the PT-RS in the l-th OFDM symbol including the PT-RS. In Equation 2, $M_{all}$ may be a sum of the numbers $M_{SC}^{UCI}(l)$ of resource elements in the OFDM symbol indexes l of 0 to $N_{symb,all}^{PUSCH}-1$.

In Equation 2A, $M_{SC}^{UL-SCH}(l)$ may be the number of resource elements used for the UL-SCH transmission in the l-th OFDM symbol. Here, l may be an integer from 0 to $N_{symb,all}^{PUSCH}-1$. In other words, a relationship of l=0, 1, 2, . . . , $N_{symb,all}^{PUSCH}-1$ may be satisfied. Also, $N_{symb,all}^{PUSCH}$ may be a total number of OFDM symbols used in the PUSCH transmission. The number of OFDM symbols used in DMRS may be included in $N_{symb,all}^{PUSCH}$. In the case of an OFDM symbol that transmits a DMRS of the PUSCH, $M_{SC}^{PUSCH}(l)$ may be provided at least based on a value obtained by subtracting the number of subcarriers of the DM-RS in the l-th OFDM symbol including the DM-RS from the scheduled bandwidth for the PUSCH transmission expressed by the number of subcarriers. In a case that the UL-SCH is transmitted in the OFDM symbol l that transmits a PUSCH-related DMRS, $M_{SC}^{UL-SCH}(l)$ may be provided at least based on $M_{SC}^{PUSCH}$. In other words, in the case that the UL-SCH is transmitted in the OFDM symbol l that transmits the PUSCH-related DMRS, a relationship of $M_{SC}^{UL-SCH}(l) = M_{SC}^{PUSCH}-M_{SC}^{DM-RS}(l)$ may be satisfied. In a case that the UL-SCH is transmitted in the OFDM symbol l that transmits the PUSCH-related DMRS, $M_{SC}^{UL-SCH}(l)$ may be greater than 0. In a case that the UL-SCH is not transmitted in the OFDM symbol l that transmits the PUSCH-related DMRS, a relationship of $M_{SC}^{UL-SCH}(l)=0$ may be satisfied. Whether or not the UL-SCH is transmitted in the OFDM symbol that transmits the PUSCH-related DMRS may be provided by a higher layer parameter. In a case that the OFDM symbol l does not transmit the PUSCH-related DMRS, $M_{SC}^{UL-SCH}(l)$ may be provided at least based on a value obtained by subtracting the number of subcarriers of the PT-RS in the l-th OFDM symbol including the PT-RS from the scheduled bandwidth for the PUSCH transmission expressed by the number of subcarriers. In other words, a relationship of $M_{SC}^{UL-SCH}(l)=M_{SC}^{PUSCH}-M_{SC}^{PT-RS}(l)$ may be satisfied. Here, $M_{SC}^{PUSCH}$ may be scheduled bandwidth for the PUSCH transmission expressed by the number of subcarriers. Also, $M_{SC}^{DM-RS}(l)$ may be the number of subcarriers that transmit the DM-RS in the l-th OFDM symbol including the DM-RS. Also, $M_{SC}^{PT-RS}(l)$ may be the number of subcarriers that transmit the PT-RS in the l-th OFDM symbol including the PT-RS. In Equation 2A, $M_{all}$ may be a sum of the numbers $M_{sc}^{UL-SCH}(l)$ of resource elements in the OFDM symbol indexes l of 0 to $N_{symb,all}^{PUSCH}-1$.

In Equation 3, in a case that a CBGTI field for indicating to the terminal apparatus 1 not to transmit the r-th code block is included in the DCI format scheduling the PUSCH transmission, $K_r$ may be 0. In a case that the CBGTI field for indicating to the terminal apparatus 1 not to transmit the r-th code block is not included in the DCI format scheduling the PUSCH transmission, $K_r$ may be the size of the r-th code block of the UL-SCH in the PUSCH transmission. r may be an integer from 0 to $C_{UL-SCH}-1$. In other words, a relationship of r=0, 1, 2, . . . , $C_{UL-SCH}-1$ may be satisfied. In a case that the UL-SCH and the HARQ-ACK are transmitted at the same time in the PUSCH, $K_{all}$ may be the sum of $K_r$, the number of which is $C_{UL\_SCH}$. In a case that the UL-SCH and the HARQ-ACK are not transmitted at the same time in the PUSCH, $K_{all}$ may be the number of bits $O_{CSI-1}$ of the CSI-part1.

In Equation 4, in a case that the terminal apparatus 1 determines $Q'_{ACK}$, $M_0$ may be the sum of the numbers $M_{SC}^{UCI}(l)$ of resource elements in the OFDM symbol indexes l of $l_0$ to $N_{symb,all}^{PUSCH-1}$. In a case that the terminal apparatus 1 determines the number $Q'_{UCI}$ of coded modulation symbols for each layer other than $Q'_{ACK}$, that is, in a case that the terminal apparatus 1 determines $Q'_{CSI-1}$ and/or $Q'_{CSI-2}$, $M_0$ may be a sum of numbers $M_{SC}^{UCI}(l)$ of resource elements in the OFDM symbol indexes l of 0 to $N_{symb,all}^{PUSCH}-1$.

In Equation 1, in a case of $U_{ACK}$, $Q'_{UCI}$ may be $Q'_{ACK}$, $O_{UCI}$ may be the number of bits $O_{ACK}$ of the HARQ-ACK, and $L_{UCI}$ may be the number of bits $L_{ACK}$ of the CRC corresponding to the number of bits $O_{ACK}$ of the HARQ-ACK. In the case of $U_{ACK}$, $\beta_{offset}^{PUSCH}$ may be a higher layer parameter $\beta_{offset}^{HARQ-ACK}$ for determining the number of resources used for multiplexing the HARQ-ACK in the PUSCH or may be an indication to use the DCI format. In the case of $U_{ACK}$, $M_0$ may be the sum of the numbers $M_{SC}^{UCI}(l)$ of resource elements in the OFDM symbol indexes l of $l_0$ to $N_{symb,all}^{PUSCH}-1$. In the case of $U_{ACK}$, $Q'_{other}$ may be 0.

In Equation 1, in the case of $U_{CSI-1}$, $Q'_{UCI}$ may be $Q'_{CSI-1}$, $O_{UCI}$ may be the number of bits $O_{CSI-1}$ of the CSI-part1, and $L_{UCI}$ may be the number of bits $L_{CSI-1}$ of the CRC corresponding to the number of bits $O_{CSI-1}$ of the CSI-part1. In the case of $U_{CSI-1}$, $\beta_{offset}^{PUSCH}$ may be the higher layer parameter $\beta_{offset}^{CSI-part1}$ for determining the number of resources used for multiplexing the CSI-part1 in the PUSCH or may be an indication to use the DCI format. In the case of $U_{CSI-1}$, $M_0$ may be a sum of the numbers $M_{SC}^{UCI}(l)$ of resource elements in the OFDM symbol indexes l of 0 to $N_{symb,all}^{PUSCH}-1$. In the case of $U_{CSI-1}$, and in a case that the number of bits $O_{ACK}$ of the HARQ-ACK is greater than 2 bits (that is, $O_{ACK}>2$), $Q'_{other}$ may be $Q'_{ACK}$. In the case of $U_{CSI-1}$, and in a case that the number of bits $O_{ACK}$ of the HARQ-ACK is equal to or smaller than the 2 bits, $Q'_{other}$ may be $Q'_{ACK,rvd}$ represented by Equation 5. In Equation 5, $M_{sc,rvd}^{ACK}(l)$ may be the number resource elements reserved for potential HARQ-ACK transmission in the OFDM symbol l, and $Q'_{ACK,rvd}$ may be the sum of the numbers $M_{sc,rvd}^{ACK}(l)$ of resource elements in the OFDM symbol indexes l of $l_0$ to $N_{symb,all}^{PUSCH}-1$.

In Equation 1, in a case of $U_{CSI-2}$, $Q'_{UCI}$ may be $Q'_{CSI-2}$, $O_{UCI}$ may be the number of bits $O_{CSI-1}$ of CSI-part2, and $L_{UCI}$ may be the number of bits $L_{CSI-2}$ of the CRC corresponding to the number of bits $O_{CSI-2}$ of the CSI-part2. In the case of $U_{CSI-2}$, $\beta_{offset}^{PUSCH}$ may be a higher layer parameter $\beta_{offset}^{CSI-part2}$ for determining the number of resources used for multiplexing the CSI-part2 in the PUSCH or may be an indication to use the DCI format. In the case of $U_{CSI-2}$, $M_0$ may be the sum of the numbers $M_{SC}^{UCI}(l)$ of resource elements in the OFDM symbol indexes l of 0 to $N_{symb,all}^{PUSCH}-1$. In the case of $U_{CSI-2}$ and in a case that the number of bits $O_{ACK}$ of the HARQ-ACK is greater than 2 bits (that is, $O_{ACK}>2$), $Q'_{other}$ may be a sum of $Q'_{ACK}$ and $Q'_{CSI-1}$. In the case of $U_{CSI-1}$ and in a case that the number of bits $O_{ACK}$ of the HARQ-ACK is equal to or smaller than 2 bits, $Q'_{other}$ may be $Q'_{CSI-1}$.

$$Q'_{UCI} = \min\left\{ \text{ceil}\left(\frac{(O_{UCI} + L_{UCI}) \cdot \beta_{offset}^{PUSCH} \cdot M_{all}}{K_{all}}\right), \right. \quad \text{Equation 1}$$
$$\left. \text{ceil}(\alpha \cdot M_0) - Q'_{other} \right\}$$

$$M_{all} = \sum_{l=0}^{N_{symb,all}^{PUSCH}-1} M_{sc}^{UCI}(l) \qquad \text{Equation 2}$$

$$M_{all} = \sum_{l=0}^{N_{symb,all}^{PUSCH}-1} M_{sc}^{UL-SCH}(l) \qquad \text{Equation 2A}$$

$$K_{all} = \sum_{r=0}^{C_{UL-SCH}-1} K_r \qquad \text{Equation 3}$$

$$M_0 = \begin{cases} \sum_{l=l_0}^{N_{symb,all}^{PUSCH}-1} M_{sc}^{UCI}(l): & HARQ-ACK \text{ transmission} \\ \sum_{l=0}^{N_{symb,all}^{PUSCH}-1} M_{sc}^{UCI}(l): & \text{otherwise} \end{cases} \qquad \text{Equation 4}$$

$$Q'_{ACK,rvd} = \sum_{l=0}^{N_{symb,all}^{PUSCH}-1} M_{sc,rvd}^{ACK}(l) \qquad \text{Equation 5}$$

A codeword may be a sequence including at least a coded bit of the UCI. The codeword may be a sequence mapped in the PRB. The codeword may be a sequence provided at least based on coupling of one or multiple rate matching output sequences. The one or multiple rate matching output sequences $f^c_e$ may be provided at least based on rate matching processing of a coded sequence $d^c_n$ of the UCI. Here, c is an index indicating the code block number. c is an index indicating a value from 0 to C−1. C indicates the number of code blocks. e indicates any of integers in the range from 0 to $E_{UCI}-1$. The $E_{UCI}$ indicates the size of rate matching output sequence $f^c_e$. n represents any of integers in the range from 0 to N−1. N may be a coded bit number of the UCI of the c-th code block. N indicates the size of coded sequence $d^c_n$ of the UCI. An input of the rate matching processing may be the coded sequence $d^c_n$ of the UCI.

The rate matching output sequence $f^c_e$ may satisfy $f^c_e = d^c_{mod(n,N)}$. Here, mod(X,Y) may be a function of outputting a remainder obtained by dividing X by Y. At least in a case that a polar code is used for channel coding and $E_{UCI}$ is equal to or greater than N, the rate matching output sequence $f^c_e$ may satisfy $f^c_e = d^c_{mod(n,N)}$. The coded sequence $d^c_n$ of the UCI may be provided by interleaving a channel-coded sequence.

The number C of code blocks is provided based on code block segmentation. In a case that the number C of code blocks is 1, coupling of code blocks may not be performed.

In the case of $U_{ACK}$, the UCI payload a may be the HARQ-ACK information, and the size $O_{UCI}$ of the UCI payload a may be provided at least based on the number of bits $O_{ACK}$ of the HARQ-ACK information. In the case of $U_{CSI-1}$, the UCI payload a may be the CSI-part1, and the size $O_{UCI}$ of the UCI payload a may be provided at least based on the number of bits $O_{CSI-1}$ of the CSI-part1. In the case of $U_{CSI-2}$, the UCI payload a may be the CSI-part2, and the size $O_{UCI}$ of the UCI payload a may be provided at least based on the number of bits $O_{CSI-2}$ of the CSI-part2. The payload including the UCI payload a and the CRC bits added to the UCI payload a will be referred to as a total payload. Also, the size $O_{UCI}$ of the UCI payload a and the size $O_{CRC}$ of CRC bits corresponding to the UCI payload a will be referred to as a total payload size.

The length $E_{UCI}$ of the rate matching output sequence provided by Equation 6 is provided at least based on the number $Q'_{UCI}$ of coded modulation symbols and/or the number $N_L$ of layers for the PUSCH and/or the number of bits $Q_m$ according to a modulation scheme. Here, in the case of $U_{ACK}$, $Q'_{UCI}$ may be the number $Q'_{ACK}$ of coded modulation symbols of $U_{ACK}$. In the case of $U_{CSI-1}$, $Q'_{UCI}$ may be the number $Q'_{CSI-1}$ of coded modulation symbols of $U_{CSI-1}$. In the case of $U_{CSI-2}$, $Q'_{UCI}$ may be the number $Q'_{CSI-2}$ of coded modulation symbols of $U_{CSI-2}$. In a case that the modulation scheme is BPSK and/or pi/2-BPSK, $Q_m$ may be 1. In a case that the modulation scheme is QPSK, $Q_m$ may be 2. $Q_m$ may be a modulation order for the PUSCH.

$$E_{UCI} = N_L \cdot Q'_{UCI} \cdot Q_m \quad \text{Equation 6}$$

In a case that the size $O_{UCI}$ of the UCI payload a is smaller than 12, the CRC bits of the size L1 are added to the UCI payload a. In a case that the size $O_{UCI}$ of the UCI payload a is equal to or greater than 12 and is equal to or smaller than 19, the CRC bits of the size L2 are added to the UCI payload a. In a case that the size $O_{UCI}$ of the UCI payload a is equal to or greater than 20, the CRC bits of the size L3 are added to the UCI payload a. In a case that the size $O_{UCI}$ of the UCI payload a is equal to or greater than 360 and the length $E_{UCI}$ of the rate matching output sequence is equal to 1088 or is greater than 1088, that is, in a case that code block segmentation is performed, the terminal apparatus 1 adds the CRC bits of the size L4 to the UCI payload a. Here, L1 may be 0. L2 may be 6. L3 may be 11. L4 may be 22.

Figure 6:
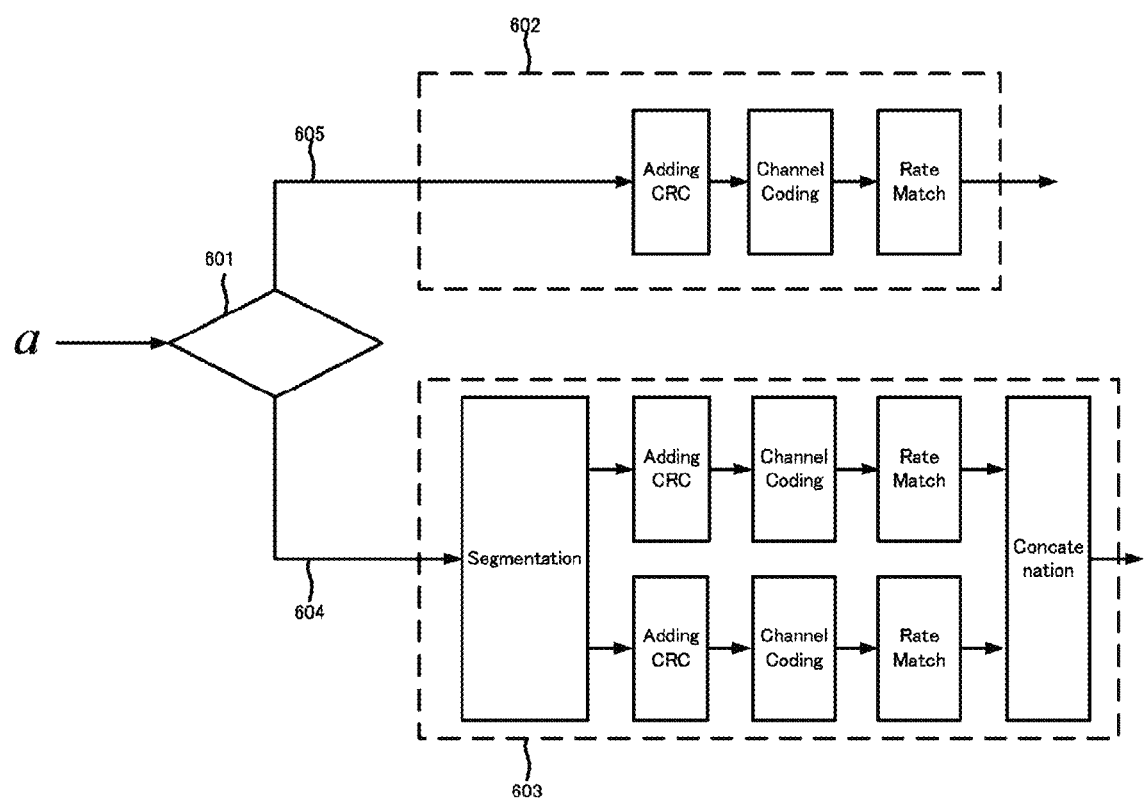
FIG. 6 is a diagram illustrating code block segmentation based on the size $O_{UCI}$ of a UCI payload a and the size $E_{UCI}$ of a rate matching output sequence $f^r_e$ according to the present embodiment.

FIG. 6 is a diagram illustrating code block segmentation based on the size $O_{UCI}$ of the UCI payload a and the size $E_{UCI}$ of the rate matching output sequence $f^c_e$ in the present embodiment.

(601) The terminal apparatus 1 determines in 601 whether to perform code block segmentation at least based on the size $O_{UCI}$ of the UCI payload a, a threshold value $K_1$ for the size $O_{UCI}$ of the UCI payload a, the size $E_{UCI}$ of the rate matching output sequence $f^c_e$ of the total payload, and a threshold value $E_1$ for the size $E_{UCI}$ of the rate matching output sequence $f^c_e$. Note that the size of CRC bits added to the UCI payload a may be determined at least based on the size $O_{UCI}$ of the UCI payload a.

(604) In a case that the size $O_{UCI}$ of the UCI payload a is equal to or greater than $K_1$, and the size $E_{UCI}$ of the rate matching output sequence $f^c_e$ is equal to or greater than $E_1$, the terminal apparatus 1 can divide the UCI payload a into two parts in the block 603 (the number C of code blocks equals to 2). Here, $K_1$ may be 360. $E_1$ may be 1088. The rate matching output sequence $f^c_e$ may be provided at least based on channel coding of the total payload including at least the UCI payload a and rate matching processing.

(605) In a case that the size $O_{UCI}$ of the UCI payload a is less than $K_1$, or the size $E_{UCI}$ of the rate matching output sequence $f^c_e$ is at least less than $E_1$, the CRC bits are added to the UCI payload a in the block 602, and channel coding is performed thereon. In other words, in a case that the size $O_{UCI}$ of the UCI payload a is at least less than $K_1$, or the size $E_{UCI}$ of the rate matching output sequence $f^c_e$ is at least less than $E_1$, code block segmentation may not be performed on the total payload (or the number C of code blocks may equal to 1). The total payload may be a payload obtained by adding the CRC bits to the UCI payload a.

Figure 7:
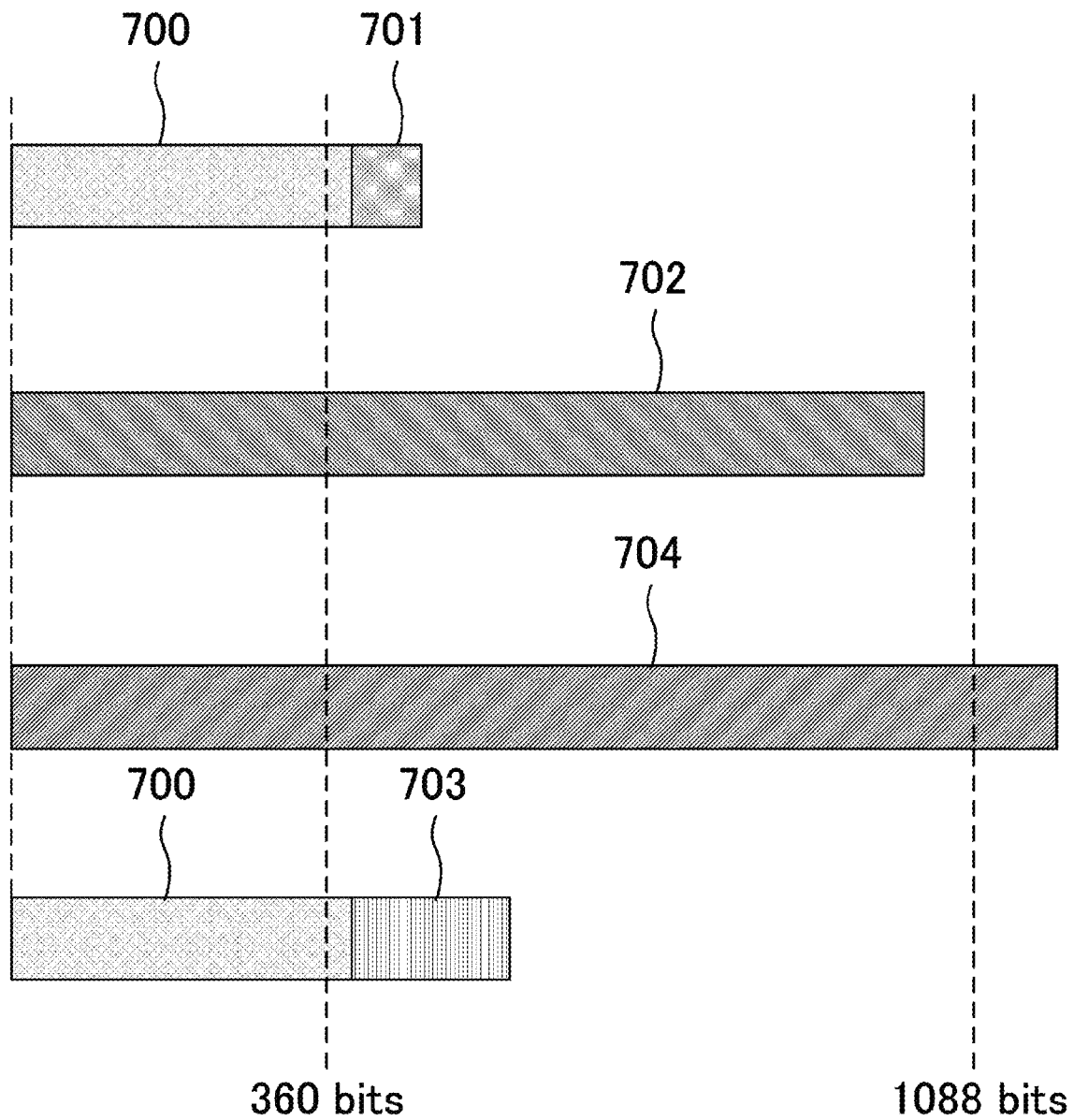
FIG. 7 is a diagram illustrating an example in which the number of CRC bits is determined according to the present embodiment.

FIG. 7 is a diagram illustrating an example in which the number of CRC bits is determined in the present embodiment. 700 may be the number of bits $O_{UCI}$ of the UCI payload a. 701 may be the number of CRC bits added to the number of bits $O_{UCI}$ of the UCI payload a in a case that no code block segmentation is assumed. 703 may be the number of CRC bits added to the number of bits $O_{UCI}$ of the UCI payload a in a case that the code block segmentation is assumed. 702 may be the length $E_{UCI}$ of the rate matching output sequence in the case that no code block segmentation is assumed. 704 may be the length $E_{UCI}$ of the rate matching output sequence in the case that the code block segmentation is assumed. In a case that the number of CRC bits added to the UCI payload a without the assumption of the code block segmentation is 701, the length $E_{UCI}$ of the rate matching output sequence satisfies a condition under which the code block segmentation is not performed as illustrated in 702. Also, in a case that the number of CRC bits added to the UCI payload a on the assumption of the code block segmentation is 703, the length $E_{UCI}$ of the rate matching output sequence satisfies the condition under which the code block segmentation is not performed as illustrated in 704.

As illustrated in FIG. 6 and FIG. 7, a problem of allowing one or multiple CRC bit numbers regardless of the number of CRC bits varying depending on whether the code block segmentation is applied occurs. In FIG. 7, for example, a problem of an error occurs in a case that the terminal apparatus 1 adds CRC bits, the number of which corresponds to 701, to the UCI payload a and transmits the UCI payload without assuming the code block segmentation and the base station apparatus attempts to decode the UCI payload a to which CRC bits, the number of which corresponds to 703, has been added, on the assumption of the code block segmentation.

The CRC added to the UCI payload a will be referred to as CRC bits. Temporary CRC bits to be referred to for determining the number $Q'_{UCI}$ of coded modulation symbols for each layer of the UCI transmitted simultaneously with the UL-SCH in the PUSCH will be referred to as virtual CRC bits. The size of CRC bits to be referred to for determining the number $Q'_{UCI}$ of coded modulation symbols for each layer of the UCI transmitted simultaneously with the UL-SCH in the PUSCH will be referred to as the size of temporary CRC bits or the size of virtual CRC bits. The size of the virtual CRC bits may be the same as or different from the size of CRC bits added to the UCI payload a. The UCI payload may be the same as the UCI payload a. The virtual CRC bits may be referred to as reference CRC bits.

The size of the virtual CRC bits may be provided at least based on the size $O_{UCI}$ of the UCI payload a. The size of the virtual CRC bits may be provided at least based on the number of bits of the HARQ-ACK information. The size of the virtual CRC bits may be provided at least based on the number of bits of the CSI. The size of the virtual CRC bits may be provided at least based on the number of bits of the HARQ-ACK information, the number of bits of the CSI, and the sum of any combination. The size of the virtual CRC bits may be provided regardless of the size $O_{UCI}$ of the UCI payload a. Here, the size of the CRC bits added to the UCI payload a may be provided at least based on the size $O_{UCI}$ of the UCI payload a. The size of the virtual CRC bits may be a predetermined value regardless of the size $O_{UCI}$ of the UCI payload a. For example, the predetermined value may be 0. Also, the predetermined value may be 6. Also, the predetermined value may be 11.

Figure 8:
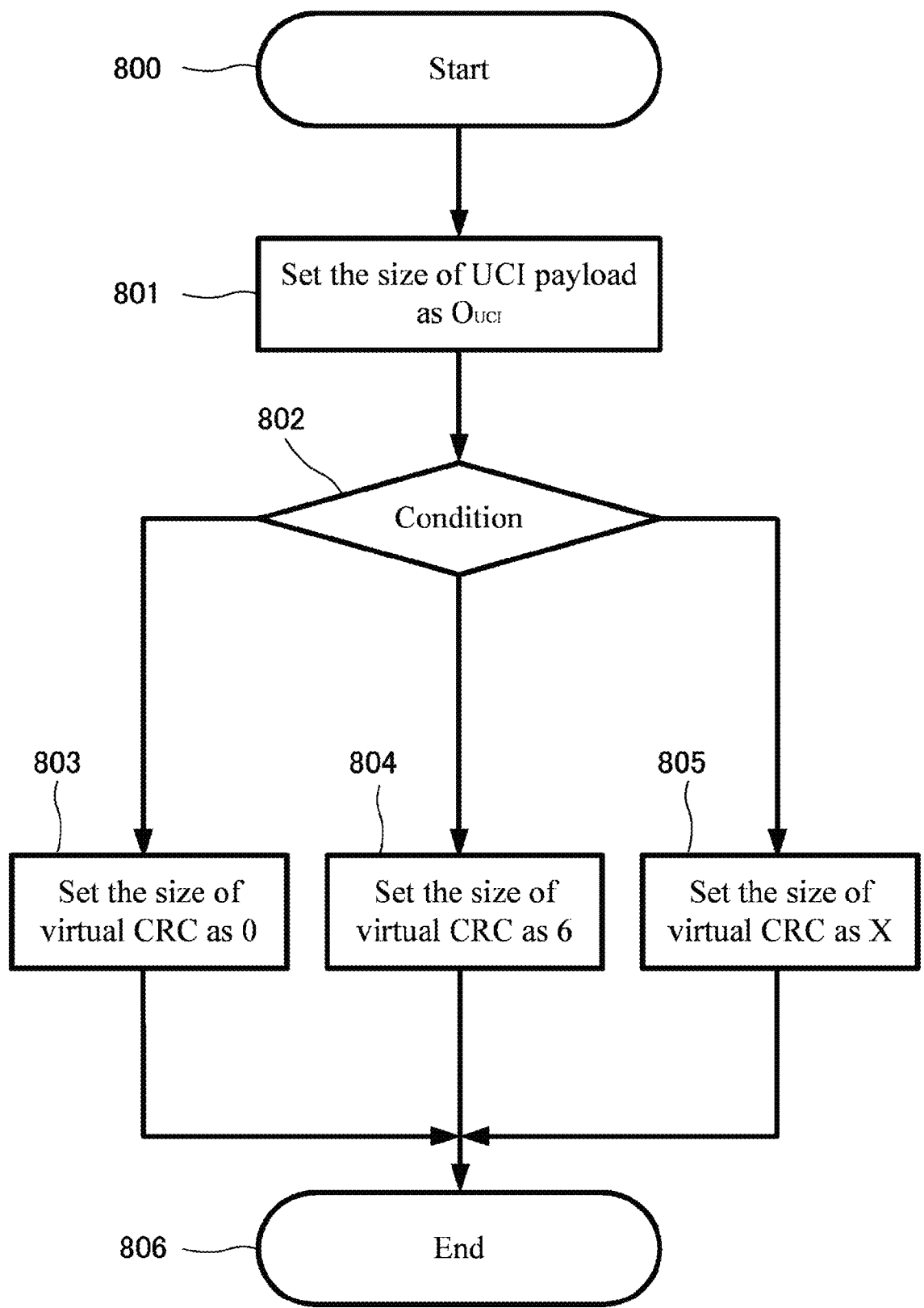
FIG. 8 is a diagram illustrating a flowchart for determining a size of virtual CRC bits according to the present embodiment.

FIG. 8 is a diagram illustrating a flowchart for determining the size of virtual CRC bits in the present embodiment. In (801), the terminal apparatus 1 sets the size of the UCI payload a to $O_{UCI}$. In (802), the terminal apparatus 1 determines the size of the virtual CRC bits at least based on the size $O_{UCI}$ of the UCI payload a. Here, in a case that $O_{UCI}$ is smaller than Y1, the process proceeds to (803). Also, in a case that $O_{UCI}$ is equal to or greater than Y1 and $O_{UCI}$ is smaller than Y2, the process proceeds to (804). Also, in a case that $O_{UCI}$ is equal to or greater than Y2, the process proceeds to (805). Here, Y1 may be 12. Y2 may be 20. For example, each of Y1 and Y2 may be a value that satisfies Y1<Y2.

(803) The terminal apparatus 1 configures the size of virtual CRC bits to 0.

(804) The terminal apparatus 1 configures the size of virtual CRC bits to 6.

(805) The terminal apparatus 1 configures the size of virtual CRC bits to X.

X may be X1. X may be X1 in a case that $O_{UCI}$ is smaller than Y3, and X may be X2 in a case that $O_{UCI}$ is equal to or greater than Y3. Here, Y3 may be 360. X1 may be 11 or 22. X2 may be 22. In regard to X1 and X2, for example, X1 may be the same as X2 or may be a smaller value than X2.

"Configuring the size of virtual CRC bits to X1" may be "configuring the size of CRC bits to be referred to for determining the number $Q'_{UCI}$ of coded modulation symbols for each layer of the UCI transmitted simultaneously with the UL-SCH in the PUSCH on the assumption that no code block segmentation is to be performed on the UCI payload a including a part or an entirety of the HARQ-ACK information and the CSI." In other words, in a case that the size of CRC bits to be referred to for determining the number $Q'_{UCI}$ of coded modulation symbols for each layer of the UCI transmitted simultaneously with the UL-SCH in the PUSCH is configured, the terminal apparatus 1 may assume that no code block segmentation is performed on the UCI payload a including a part or an entirety of the HARQ-ACK information and CSI. In a case that the size of CRC bits to be referred to for determining the number $Q'_{UCI}$ of coded modulation symbols for each layer of the UCI transmitted simultaneously with the UL-SCH in the PUSCH is configured, even on the assumption by the terminal apparatus 1 that no code block segmentation is to be performed on the UCI payload a including a part or an entirety of the HARQ-ACK information and the CSI, the code block segmentation may be performed on the UCI payload a including a part or an entirety of the HARQ-ACK information and the CSI at least based on E'uci and the UCI payload a, and the size of actual CRC bits may be determined based on the fact that the code block segmentation has been performed on the UCI payload a including a part or an entirety of the HARQ-ACK information and the CSI.

"Configuring the size of virtual CRC bits to X2" may be "configuring the size of CRC bits to be referred to for determining the number $Q'_{UCI}$ of coded modulation symbols for each layer of the UCI transmitted simultaneously with the UL-SCH in the PUSCH on the assumption that code block segmentation is to be performed on the UCI payload a including a part or an entirety of the HARQ-ACK information and CSI." In other words, in a case that the size of CRC bits to be referred to for determining the number $Q'_{UCI}$ of coded modulation symbols for each layer of the UCI transmitted simultaneously with the UL-SCH in the PUSCH is configured, the terminal apparatus 1 may assume that the code block segmentation is performed on the UCI payload a including a part or an entirety of the HARQ-ACK information and CSI. In a case that the size of CRC bits to be referred to for determining the number $Q'_{UCI}$ of coded modulation symbols for each layer of the UCI transmitted simultaneously with the UL-SCH in the PUSCH is configured, even on the assumption by the terminal apparatus 1 that the code block segmentation is to be performed on the UCI payload a including a part or an entirety of the HARQ-ACK information and the CSI, the code block segmentation may not be performed on the UCI payload a including a part or an entirety of the HARQ-ACK information and the CSI at least based on $E_{UCI}$ and UCI payload a, and the size of actual CRC bits may be determined based on the fact that no code block segmentation is performed on the UCI payload a including a part or an entirety of the HARQ-ACK information and the CSI.

In a case that $O_{UCI}$ is smaller than Y3, the size of virtual CRC bits may be the same as the size of CRC bits to be added to the UCI payload a. In the case that $O_{UCI}$ is smaller than Y3, the size of the virtual CRC bits and the size of CRC bits added to the UCI payload a are provided based on $O_{UCI}$.

In a case that $O_{UCI}$ is greater than Y3 or the same as Y3, the size of virtual CRC bits and the size of CRC bits added to the UCI payload a may be the same as or different from each other. In a case that $O_{UCI}$ is greater than Y3 or the same as Y3, the size of virtual CRC bits is provided based on $O_{UCI}$, and the size of CRC bits added to the UCI payload a is provided based on $O_{UCI}$ and $E_{UCI}$.

The size of virtual CRC bits may be provided regardless of the size $E_{UCI}$ of a rate matching output sequence $f^r_e$.

The number $Q'_{UCI}$ of coded modulation symbols for each layer of the UCI transmitted simultaneously with the UL-SCH in the PUSCH may be provided at least based on the size of virtual CRC bits provided based on the size $O_{UCI}$ of the UCI payload a. In the present embodiment, the size of CRC bits may be the number of CRC bits.

Hereinafter, various aspects of the terminal apparatus 1 and the base station apparatus 3 according to the present embodiment will be described.

(1) According to a first aspect of the present embodiment, there is provided a terminal apparatus including: a coder configured to code a UCI payload and perform rate matching of coded bits of the UCI payload; and a transmitter configured to transmit the UCI payload by using a PUSCH, in which the UCI payload includes at least HARQ-ACK information and/or CSI, a length of an output sequence $E_{UCI}$ of the rate matching is provided based on a first number of CRC bits $L_{UCI}$, the first number of CRC bits $L_{UCI}$ is provided based on a size of the payload, and a size of second CRC bits added to the payload is provided based on the size of the payload and the length of the output sequence $E_{UCI}$ of the rate matching.

(2) In the first aspect of the present embodiment, a number of coded modulation symbols $Q'_{UCI}$ for a layer is provided based on the first number of CRC bits $L_{UCI}$, and the length of the output sequence $E_{UCI}$ of the rate matching is provided based on the number of the coded modulation symbols $Q'_{UCI}$ for the layer, a modulation order for the PUSCH, and a number of layers $N_L$ for the PUSCH.

(3) According to a second aspect of the present embodiment, there is provided a base station apparatus including: a decoder configured to decode a UCI payload and perform rate matching of decoded bits of the UCI payload; and a receiver configured to receive the UCI payload by using a PUSCH, in which the UCI payload includes at least HARQ-ACK information and/or CSI, a length of an output sequence $E_{UCI}$ of the rate matching is provided based on a first number of CRC bits $L_{UCI}$, the first number of CRC bits $L_{UCI}$ is provided based on a size of the payload, and a size of second CRC bits added to the payload is provided based on the size of the payload and the length of the output sequence $E_{UCI}$ of the rate matching.

(4) In the second aspect of the present embodiment, a number of coded modulation symbols $Q'_{UCI}$ for a layer is provided based on the first number of CRC bits $L_{UCI}$, and the length of the output sequence $E_{UCI}$ of the rate matching is provided based on the number of the coded modulation symbols $Q'_{UCI}$ for the layer, a modulation order for the PUSCH, and the number of layers $N_L$ for the PUSCH.

This allows the terminal apparatus 1 and the base station apparatus 3 to efficiently perform uplink transmission and reception.

Each of a program running on the base station apparatus 3 and the terminal apparatus 1 according to the present invention may be a program that controls a central processing unit (CPU) and the like (a program that causes a computer to function) in such a manner as to realize the functions of the aforementioned embodiment according to the present invention. The information handled in these devices is temporarily stored in a Random Access Memory (RAM) while being processed. Thereafter, the information is stored in various types of Read Only Memory (ROM) such as a Flash ROM and a Hard Disk Drive (HDD), and when necessary, is read by the CPU to be modified or rewritten.

Note that the terminal apparatus 1 and the base station apparatus 3 according to the above-described embodiment may be partially achieved by a computer. In such a case, a program for realizing such control functions may be recorded on a computer-readable recording medium to cause a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. Furthermore, a "computer-readable recording medium" refers to a portable medium such as a flexible disk, a magneto-optical disk, a ROM, a CD-ROM, and the like, and a storage device such as a hard disk built into the computer system.

The "computer-readable recording medium" may include a medium that dynamically retains the program for a short period of time, such as a communication line that is used to transmit the program over a network such as the Internet or over a communication line such as a telephone line, and a medium that retains, in that case, the program for a certain period of time, such as a volatile memory within the computer system which functions as a server or a client. The program may be configured to realize some of the functions described above, and also may be configured to be capable of realizing the functions described above in combination with a program already recorded in the computer system.

Furthermore, the base station apparatus 3 according to the above-described embodiment may be achieved as an aggregation (apparatus group) including multiple apparatuses. Each of the apparatuses constituting such an apparatus group may include some or all portions of each function or each functional block of the base station apparatus 3 according to the above-described embodiment. The apparatus group is required to have a complete set of functions or functional blocks of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some or all of the functions of a node higher than an eNodeB.

Furthermore, some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. A circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

The invention claimed is:

1. A terminal apparatus comprising:
   transmission circuitry configured to and/or programmed to:
   encode an uplink control information (UCI) payload;
   perform rate matching of coded bits of the UCI payload, and
   transmit the UCI payload on a Physical Uplink Shared Channel (PUSCH); wherein
   the UCI payload includes at least hybrid automatic repeat request acknowledgement (HARQ-ACK) information and/or channel state information (CSI);
   a first number of Cyclic Redundancy Check (CRC) bits is given based on a size of the UCI payload;

a length of an output sequence of the rate matching is given based on the first number of CRC bits;
whether a code block segmentation of the UCI payload is applied or not is determined based on the size of the UCI payload and the length of the output sequence of the rate matching;
a second number of CRC bits added to the UCI payload is given based on whether the code block segmentation of the UCI payload is applied or not; and
the first number of CRC bits is given regardless of the second number of CRC bits.

2. A base station apparatus comprising:
reception circuitry configured to and/or programmed to:
  receive a uplink control information (UCI) payload on a Physical Uplink Shared Channel (PUSCH) from a terminal apparatus; and
  decode the UCI payload; wherein
the UCI payload includes at least hybrid automatic repeat request acknowledgement (HARQ-ACK) information and/or channel state information (CSI);
a first number of Cyclic Redundancy Check (CRC) bits is given based on a size of the UCI payload;
a length of an output sequence of rate matching by the terminal apparatus is given based on the first number of CRC bits;
whether a code block segmentation of the UCI payload by the terminal apparatus is applied or not is determined based on the size of the UCI payload and the length of the output sequence of the rate matching by the terminal apparatus;
a second number of CRC bits added to the UCI payload by the terminal apparatus is given based on whether the code block segmentation of the UCI payload by the terminal apparatus is applied or not; and
the first number of CRC bits is given regardless of the second number of CRC bits.

3. A communication method used by a terminal apparatus, the communication method comprising:
encoding a uplink control information (UCI) payload;
performing rate matching of coded bits of the UCI payload; and
transmitting the UCI payload on a Physical Uplink Shared Channel (PUSCH); wherein
the UCI payload includes at least hybrid automatic repeat request acknowledgement (HARQ-ACK) information and/or channel state information (CSI);
a first number of Cyclic Redundancy Check (CRC) bits is given based on a size of the UCI payload;
a length of an output sequence of the rate matching is given based on the first number of CRC bits;
whether a code block segmentation of the UCI payload is applied or not is determined based on the size of the UCI payload and the length of the output sequence of the rate matching;
a second number of CRC bits added to the UCI payload is given based on whether the code block segmentation of the UCI payload is applied or not; and
the first number of CRC bits is given regardless of the second number of CRC bits.

4. A communication method used by a base station apparatus, the communication method comprising:
receiving an uplink control information (UCI) payload on a Physical Uplink Shared Channel (PUSCH) from a terminal apparatus; and
decoding the UCI payload; wherein
the UCI payload includes at least hybrid automatic repeat request acknowledgement (HARQ-ACK) information and/or channel state information (CSI);
a first number of Cyclic Redundancy Check (CRC) bits is given based on a size of the UCI payload;
a length of an output sequence of rate matching by the terminal apparatus is given based on the first number of CRC bits;
whether a code block segmentation of the UCI payload by the terminal apparatus is applied or not is determined based on the size of the UCI payload and the length of the output sequence of the rate matching by the terminal apparatus;
a second number of CRC bits added to the UCI payload by the terminal apparatus is given based on whether the code block segmentation of the UCI payload by the terminal apparatus is applied or not; and
the first number of CRC bits is given regardless of the second number of CRC bits.

* * * * *